(12) United States Patent
Coupard et al.

(10) Patent No.: US 12,117,364 B2
(45) Date of Patent: Oct. 15, 2024

(54) METHOD FOR MONITORING AN EPICYCLIC GEAR TRAIN BY PROGRESSIVE MECHANICAL WAVE MEASUREMENT

(71) Applicant: SAFRAN AIRCRAFT ENGINES, Paris (FR)

(72) Inventors: Josselin Xavier Coupard, Moissy-Cramayel (FR); Valentin Francis Joël Facquet, Moissy-Cramayel (FR); Julien Christian Pascal Griffaton, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 327 days.

(21) Appl. No.: 17/753,376

(22) PCT Filed: Sep. 4, 2020

(86) PCT No.: PCT/FR2020/051534
§ 371 (c)(1),
(2) Date: Mar. 1, 2022

(87) PCT Pub. No.: WO2021/044106
PCT Pub. Date: Mar. 11, 2021

(65) Prior Publication Data
US 2022/0291086 A1 Sep. 15, 2022

(30) Foreign Application Priority Data
Sep. 6, 2019 (FR) ..................................... 1909851

(51) Int. Cl.
*G01M 13/028* (2019.01)
*G01M 13/021* (2019.01)

(52) U.S. Cl.
CPC ........ *G01M 13/028* (2013.01); *G01M 13/021* (2013.01)

(58) Field of Classification Search
CPC ..... G01M 13/028; G01M 13/021; F16H 1/32; F16H 2001/327
See application file for complete search history.

(56) References Cited

U.S. PATENT DOCUMENTS 5,086,994 A * 2/1992 Donnelly ................ B64C 25/50
244/50
6,966,865 B2 * 11/2005 Drago ...................... F16H 1/28
475/342

(Continued)

FOREIGN PATENT DOCUMENTS

| CN | 105806613 A | 7/2016 | |
| EP | 2931604 A2 * | 10/2015 | ............. B64C 27/52 |
| EP | 3217170 A1 | 9/2017 | |

OTHER PUBLICATIONS

Search Report issued in French Patent Application No. 1909851 dated May 15, 2020.

(Continued)

*Primary Examiner* — Tung S Lau
(74) *Attorney, Agent, or Firm* — Pearne & Gordon LLP

(57) ABSTRACT

A method for monitoring an epicyclic gear train of an aircraft includes the following steps: acquiring, at a predetermined sampling frequency, first values (5(ti)) of a signal formed by a progressive mechanical wave generated in the epicyclic gear train; measuring, at a plurality of successive instants, values (Vmes _r(tj)) of a speed of rotation of at least one of the toothed wheels of the gear train; calculating values (Vc(tj)) of a speed of rotation of a point of contact between two toothed wheels of the epicyclic gear train; determining second values (S(ç½)) of the signal formed by a progressive mechanical wave generated in the epicyclic (Continued)

gear train, the second values being sampled depending on a phase of the point of contact and forming secondary mechanical wave data; and using the secondary mechanical wave data ($S(ç^{1/2})$) to detect an anomaly related to the operation of the epicyclic gear train.

15 Claims, 7 Drawing Sheets

(56) References Cited

U.S. PATENT DOCUMENTS

| | | | |
|---|---|---|---|
| 9,086,335 B2* | 7/2015 | Dolenti | G01M 13/028 |
| 10,168,248 B1 | 1/2019 | Morey et al. | |
| 2016/0023756 A1* | 1/2016 | Carreker | B64C 27/28 416/1 |
| 2018/0121596 A1* | 5/2018 | White | F16H 57/0006 |
| 2019/0161176 A1* | 5/2019 | Morris | B64C 25/34 |

OTHER PUBLICATIONS

International Search Report for issued in Application No. PCT/FR2020/051534 dated Dec. 16, 2020.

Written Opinion for PCT/FR2020/051534 dated Dec. 16, 2020.

\* cited by examiner

METHOD FOR MONITORING AN EPICYCLIC GEAR TRAIN BY PROGRESSIVE MECHANICAL WAVE MEASUREMENT

This is the National Stage of PCT international application PCT/FR2020/051534, filed on Sep. 4, 2020 entitled "METHOD FOR MONITORING AN EPICYCLIC GEAR TRAIN BY PROGRESSIVE MECHANICAL WAVE MEASUREMENT", which claims the priority of French Patent Application No. 1909851 filed Sep. 6, 2019, both of which are incorporated herein by reference in their entireties.

TECHNICAL FIELD

The invention relates to the field of monitoring a mechanical transmission device in an aircraft.

STATE OF PRIOR ART

Different systems and methods for monitoring a mechanical transmission device in an aircraft are known from prior art.

In patent application EP3217170, it is taught to monitor such a mechanical transmission device by means of an acoustic sensor. The acoustic sensor measures an acoustic signal, generated by mechanical vibrations in the mechanical transmission device. An anomaly in the operation of the mechanical transmission device results in characteristic peaks in the frequency spectrum of the acoustic signal measured.

A purpose of the present invention is to provide an improved method for monitoring a mechanical transmission device in an aircraft, which is particularly adapted for monitoring an epicyclic gear train.

DISCLOSURE OF THE INVENTION

This purpose is achieved with a method for monitoring an epicyclic gear train of an aircraft, wherein the epicyclic gear train includes two coaxially mounted first toothed wheels and at least one second toothed wheel meshing with the two first toothed wheels, the method including the following steps of:
  acquiring, at a predetermined sampling frequency, first values of a signal formed by a progressive mechanical wave generated in the epicyclic gear train, said first values forming primary mechanical wave data;
  measuring, at a plurality of successive time instants, values of a speed of rotation of at least one of the first two toothed wheels and the at least one second toothed wheel, said measured values forming primary rotation data;
  from the primary rotation data, calculating values of a speed of rotation of a contact point between the one first toothed wheel and the one second toothed wheel of the epicyclic gear train, said calculated values forming secondary rotation data;
  from the primary mechanical wave data and the secondary rotation data, determining second values of said signal formed by a progressive mechanical wave generated in the epicyclic gear train, said second values corresponding to a regular sampling as a function of the phase of said contact point and forming secondary mechanical wave data; and
  using the secondary mechanical wave data to detect an anomaly related to the operation of the epicyclic gear train.

The first two coaxially mounted toothed wheels are called the ring gear and the sun gear respectively, where the sun gear is surrounded by the ring gear. The at least one second toothed wheel is called a planet gear.

The primary mechanical wave data correspond to sampling, as a function of time, of a signal formed by a progressive mechanical wave generated in the epicyclic gear train. This signal relates to a vibration in an elastic medium. It may be an acoustic signal, or a vibrational signal capable of being measured by an accelerometer. A time interval between two successive sampling time instants is constant.

The primary rotation data are measured at different time instants, in parallel with the acquisition of primary mechanical wave data. Primary rotation data refer to measurements of the respective speed of rotation of at least one of the toothed wheels of the epicyclic gear train. The speed of rotation, or engine speed, is expressed for example in revolutions per time unit. The speed of rotation is measured, for example, using an optical sensor detecting passage of a predetermined reference point on the toothed wheel.

The secondary rotation data are calculated values of a speed of rotation of a contact point between two toothed wheels in the epicyclic gear train. The speed of rotation of said contact point forms a so-called dummy speed. The contact point is a contact point between a planet gear and the ring gear, or between a planet gear and the sun gear. Any of these contact points can be considered. The values of a speed of rotation of the contact point are determined for a plurality of time instants, preferably corresponding to the time instants of measurement of the primary rotation data.

The calculated values of a speed of rotation of the contact point are then used to simulate resampling of the signal formed by the progressive mechanical wave generated in the epicyclic gear train. Resampling is this time constant as a function of the phase of said contact point. In other words, there is a constant phase difference between two points of resampling, where the phase is related to said contact point and is obtained from the speed of rotation of said contact point. This new sampling of the progressive mechanical wave signal generated in the epicyclic gear train forms secondary mechanical wave data.

These secondary mechanical wave data are then used to detect an anomaly in the operation of the epicyclic gear train. For this, models can be used, which associate an anomaly with predefined characteristics of a function that depends on said secondary mechanical wave data. The models can be determined experimentally or by simulations.

The invention thus offers a method for monitoring an epicyclic gear train of an aircraft, based on clever resampling of a signal formed by a progressive mechanical wave generated in the epicyclic gear train.

It may be advantageous to in-phase resample a signal formed by a progressive mechanical wave generated in a mechanical transmission device, when the latter is a simple gear with only two toothed wheels. In the case of an epicyclic gear train, the complex arrangement of the toothed wheels leads the skilled person to avoid such resampling. The idea underlying the invention is to keep in-phase resampling, but taking as reference not one of the toothed wheels of the epicyclic gear train, but a contact point between two of these toothed wheels. The inventors were able to show that this idea makes it possible to obtain resampled data allowing efficiently locating of a mechanical anomaly of the epicyclic gear train.

Advantageously, the speed of rotation of the contact point between a first toothed wheel and a second toothed wheel of the epicyclic gear train is a linear combination of the respective speeds of rotation of said first and second toothed wheels.

At least one of said respective speeds of rotation may be calculated from the primary rotation data ($V_{mes_r}(t_j)$) and the respective numbers of teeth of at least two of the first two toothed wheels and the at least one second toothed wheel.

According to one advantageous embodiment, using the secondary mechanical wave data ($S(\varphi_k)$) to detect an anomaly related to the operation of the epicyclic gear train comprises:
- calculating analysis data, including calculating a Fourier transform of the secondary mechanical wave data ($S(\varphi_k)$), where the Fourier transform transforms a function of a phase into a function of an order; and
- using said analysis data to detect an anomaly related to the operation of the epicyclic gear train.

Analysis data associated with at least one integer order may then be used to detect an anomaly related to the operation of the epicyclic gear train.

Calculating analysis data may comprise calculating a power spectral density of the secondary mechanical wave data ($S(\varphi_k)$).

Alternatively, calculating analysis data may comprise calculating an averaged power spectral density of the secondary mechanical wave data ($S(\varphi_k)$).

Further alternatively, calculating analysis data may comprise calculating a spectrogram gathering a plurality of values of an averaged power spectral density of the secondary mechanical wave data ($S(\varphi_k)$).

The signal formed by a progressive mechanical wave generated in the epicyclic gear train may be an acoustic signal, acquired using an acoustic wave sensor. This acoustic wave sensor is advantageously arranged at a position spaced from the epicyclic gear train.

Alternatively, the signal formed by a progressive mechanical wave generated in the epicyclic gear train is a vibration signal, acquired using an accelerometer.

The monitoring method may further comprise a maintenance step on the epicyclic gear train, when an anomaly related to the operation of the epicyclic gear train is detected using the secondary mechanical wave data ($S(\varphi_k)$).

Finally, said monitoring method may further include a preliminary step of determining health indicators, which includes the following substeps of:
- for a plurality of flights, acquiring primary mechanical wave data and primary rotation data, and determining the corresponding secondary rotation data and secondary mechanical wave data;
- for each of the plurality of flights, calculating analysis data, said calculating including calculating a Fourier transform of the secondary mechanical wave data; and
- correlating the analysis data with information relating to an anomaly or absence of anomaly in the operation of the epicyclic gear train.

The invention also relates to a monitoring system for monitoring an epicyclic gear train of an aircraft, the system comprising:
- an epicyclic gear train which includes two coaxially mounted first toothed wheels and at least one second toothed wheel meshing with the first two toothed wheels;
- at least one mechanical wave sensor, arranged to acquire, at a predetermined sampling frequency, first values of a signal formed by a progressive mechanical wave generated in the epicyclic gear train, said first values forming primary mechanical wave data ($S(t_i)$);
- at least one speed of rotation sensor, arranged to acquire, at a plurality of successive time instants, values of a speed of rotation of at least one of the first two toothed wheels and the at least one second toothed wheel, said measured values forming primary rotation data ($V_{mes_r}(t_j)$); and
- a processor, configured to receive as an input the primary mechanical wave data ($S(t_i)$) and the primary rotation data ($V_{mes_r}(t_j)$), to calculate values ($V_c(t_j)$) of a speed of rotation of a contact point between the one first toothed wheel and the one second toothed wheel of the epicyclic gear train, to determine second values of said signal formed by a progressive mechanical wave generated in the epicyclic gear train, said second values being sampled as a function of a phase of said contact point, and to output a piece of information (D) relating to the presence or not of an anomaly in the operation of the epicyclic gear train.

The mechanical wave sensor is typically an acoustic sensor, arranged at a position spaced from the epicyclic gear train.

BRIEF DESCRIPTION OF THE DRAWINGS

The present invention will be better understood upon reading the description of exemplary embodiments given purely by way of indication and in no way limiting purposes, with reference to the appended drawings in which.

DETAILED DISCLOSURE OF PARTICULAR EMBODIMENTS

Figure 1:
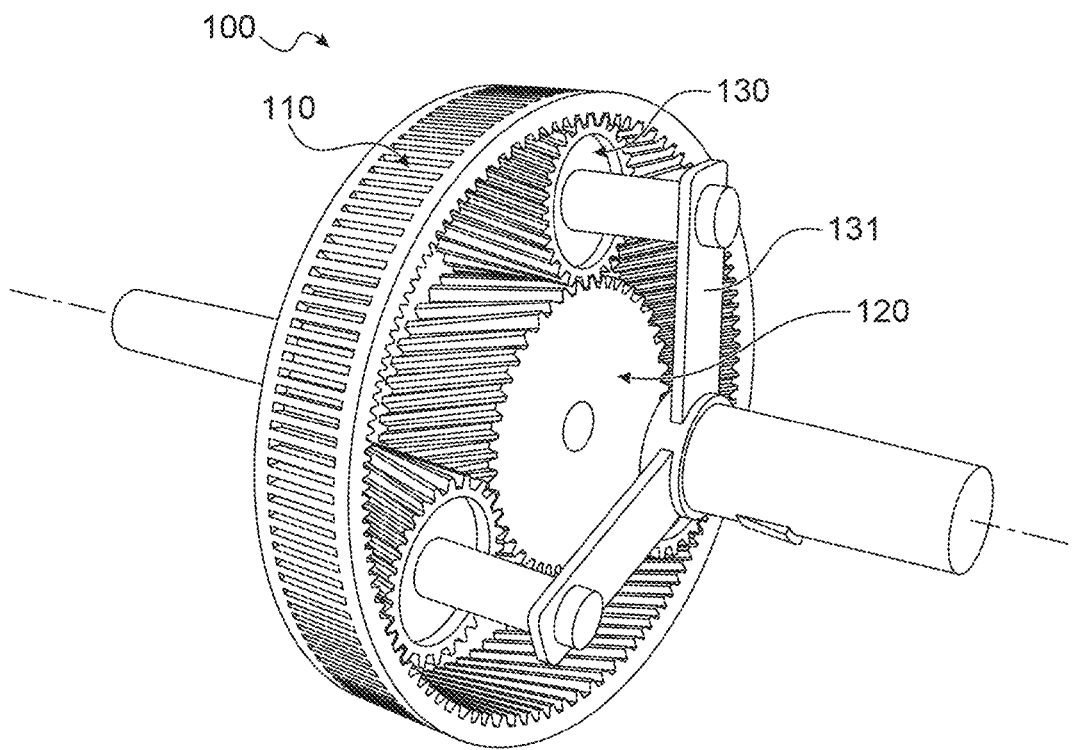
FIGS. 1 and 2 schematically illustrate an epicyclic gear train, in a perspective view, respectively a front view.

FIG. 1 illustrates, in perspective view, an example of an epicyclic gear train 100 to which the invention may be applied. The epicyclic gear train 100 here includes:
- a ring gear 110, mounted integral with a downstream propeller of a turboshaft engine (not represented);
- a sun gear 120, mounted integral with a shaft connected to a power turbine (not represented); and
- three planet gears 130, mounted integral with an upstream propeller of the turboshaft engine (not represented) through a three-branches connecting piece 131.

The ring gear 110 and sun gear 120 are coaxially mounted, with the ring gear 110 being arranged around the sun gear 120. They form together two first toothed wheels.

The three planet gears 130 are equally distributed around the sun gear 120, and each arranged between the ring gear 110 and the sun gear 130. They form together three second toothed wheels which each mesh with both the ring gear 110 and the sun gear 130. The connecting piece 131 has each of its three branches attached to the rotation shaft of one of the planet gears 130.

Figure 2:
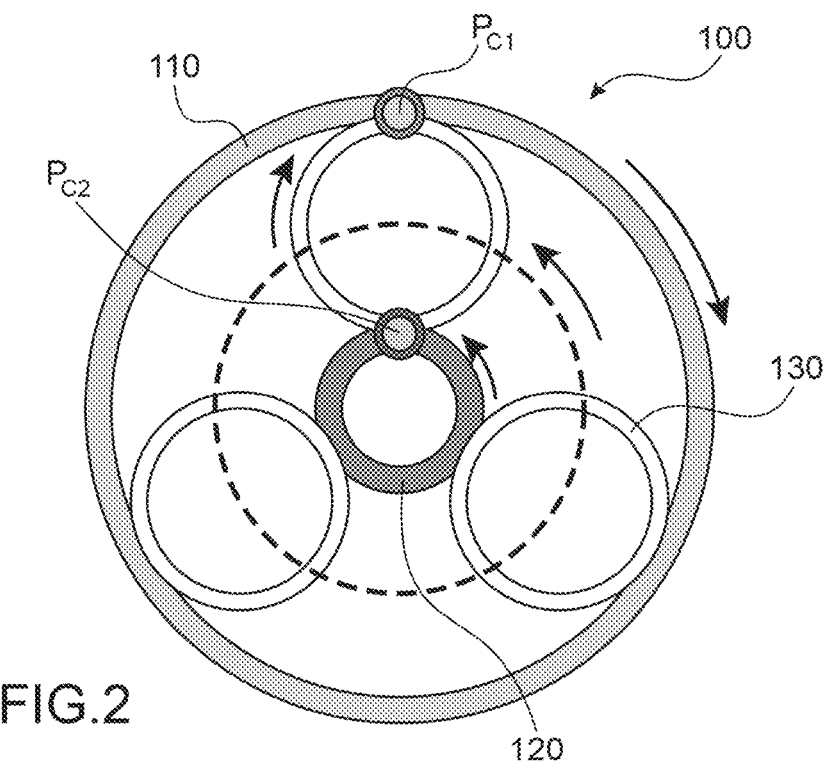

FIG. 2 schematically illustrates the epicyclic gear train 100 in a front view. The direction of rotation of each of the elements of the epicyclic gear train 100 is represented by arrows. The respective directions of rotation of the ring gear 110 and the sun gear 120 are opposite to each other. Each of the three planet gears 130 can rotate about itself and/or about the sun gear 120. The rotation of the planet gears 130 about the sun gear 120 is symbolised in FIG. 2 by a dotted circle. The direction of rotation of the planet gears 130 about the sun gear 120 corresponds to the direction of rotation of the sun gear 120 about itself.

FIG. 2 also illustrates two contact points $P_{C1}$, respectively $P_{C2}$, in the epicyclic gear train 100. $P_{C1}$ is the contact point between one of the planet gears 130 and the ring gear 110. $P_{C2}$ is the contact point between one of the planet gears 130 and the sun gear 120. Each of the three planet gears has two contact points, respectively with the ring gear 110 and with the sun gear 120.

Figure 3:
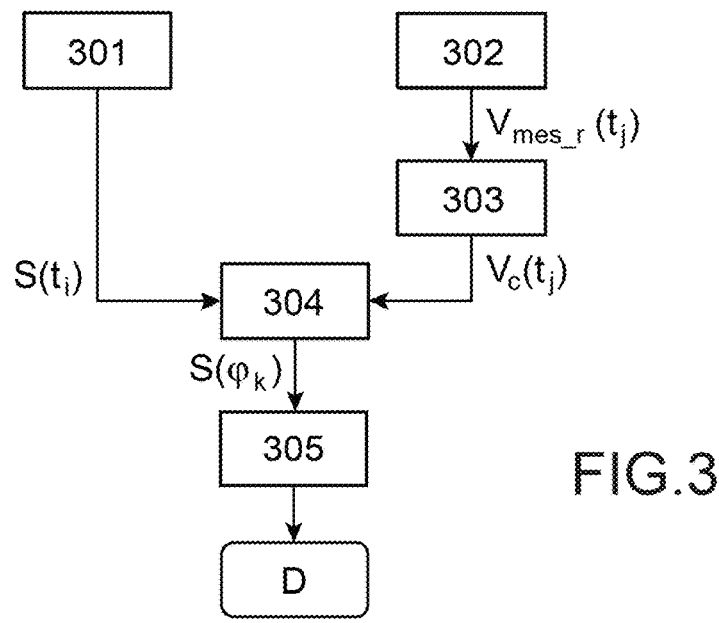
FIG. 3 schematically illustrates a method according to the invention, for monitoring the epicyclic gear train of FIG. 1.

FIG. 3 schematically illustrates a method according to the invention, for monitoring the epicyclic gear train 100 in operation.

In a first step 301, a series of values $S(t_i)$ of a signal $S(t)$ formed by a progressive mechanical wave generated in the epicyclic gear train 100 is acquired. The progressive mechanical wave is in particular an elastic wave. It is generated especially by clashes of the teeth of the planet gears with teeth of the ring gear and teeth of the sun gear. The characteristics of these clashes depend especially on manufacturing errors and the elastic deformation of the teeth. The signal $S(t)$ is preferentially an acoustic signal, relating to a wave radiated by the epicyclic gear train, and acquired using an acoustic wave sensor such as a microphone or an acoustic pressure sensor. As an acoustic signal is capable of being propagated through any solid, liquid or gaseous medium, the acoustic wave sensor can be arranged freely, directly on the epicyclic gear train or away therefrom. Alternatively, the signal $S(t)$ is a vibrational signal, relating to a wave conducted in an elastic solid medium, and acquired using a sensor such as an accelerometer. In this case, the accelerometer should be arranged in direct physical contact with the epicyclic gear train or with an intermediate solid medium itself in direct physical contact with the epicyclic gear train. The values $S(t_i)$ are acquired with a sampling frequency $f_{ech}$. Stated differently, the acquisition time instants $t_j$ associated with the different values $S(t_i)$ are separated two by two by a fixed time interval. The acquired values $S(t_i)$ form data called primary mechanical wave data.

In a second step 302, implemented in parallel to step 301, a series of values $V_{mes\_r}(t_j)$ of the respective speed of rotation(s) of at least one of the toothed wheels r among the ring gear, the sun gear, and the three planet gears is acquired. In other words, a series of values of the respective speed of at least one of the toothed wheels r among the ring gear, the sun gear, and the three planet gears of the epicyclic gear train is acquired. The speed of rotation values $V_{mes\_r}(t_j)$ are angular speeds, expressed for example in revolutions per minute. Each speed of rotation here refers to the speed of rotation of a toothed wheel, rotating on itself. In the case of a planet gear 130, this speed of rotation is only related to the rotation of the planet gear 130 on itself, without considering its possible rotation about the sun gear 120. Preferably, it is assumed that all three planet gears have the same speed of rotation. The values $V_{mes\_r}(t_j)$ are acquired using a sensor of the tachometer type, including, for example, an optical sensor capable of locating passage of a predetermined reference point on the toothed wheel, or a sensor capable of measuring the passage duration of a toothed wheel (a short duration corresponding to a rapid tooth passage, and therefore to a high speed of rotation). Where applicable, the speed of rotation of a toothed wheel is measured at a propeller or turbine mounted integrally therewith. The different values $V_{mes\_r}(t_j)$ are associated with a series of acquisition time instants $t_j$. The values $V_{mes\_r}(t_j)$ form data called primary rotation data.

In a third step 303, the primary rotation data is used to calculate values $V_c(t_j)$ of a theoretical speed of rotation, of a contact point in the epicyclic gear train 100. This speed of rotation is also called the "dummy speed". The contact point refers to any of the contact points between one of the planet gears 130 and the ring gear 110, respectively between one of the planet gears 130 and the sun gear 120. FIG. 2 illustrates two such contact points, $P_{C1}$ and $P_{C2}$.

The speed of rotation of the contact point is a speed of rotation considered in a reference frame attached to an aircraft receiving the epicyclic gear train. The speed of rotation is the same for all contact points of the epicyclic gear train 100, so that any of these contact points can be considered equally.

The speed of rotation of the contact point between two toothed wheels of the epicyclic gear train is a linear combination of the respective speeds of rotation of said two toothed wheels. It also depends on the respective numbers of teeth of said two toothed wheels.

Calculating $V_c(t_j)$ therefore uses values of the respective speeds of rotation of two toothed wheels in contact in the epicyclic gear train. These values used may belong to the primary rotation data acquired in step 302. Alternatively, at least some of said values used may be obtained by calculation, from the primary rotation data and numbers of teeth of the toothed wheels in the epicyclic gear train. Indeed, in an epicyclic gear train, the ratio of the speeds of rotation of two toothed wheels in contact is a function of a ratio between the respective numbers of teeth of said wheels. In any case, the method according to the invention is preferably adapted to collect speed of rotation values relating to each of the three types of toothed wheel of the epicyclic gear train (ring gear 110, sun gear 120, planet gear 130). These values may all be acquired in step 302. Alternatively, some of these values are not acquired in step 302, and are instead determined by calculation, using the above-mentioned relationship between the respective speeds of rotation and number of teeth of two toothed wheels in contact in an epicyclic gear train.

Preferably, a value $V_c(t_j)$ is calculated for each time instant $t_j$ as defined above. The values $V_c(t_j)$ thus calculated together form data called secondary rotation data.

In a fourth step 304, the primary mechanical wave data, $S(t_i)$, and the secondary rotation data, $V_c(t_j)$, are used to simulate sampling at constant phase intervals of the signal S formed by a progressive mechanical wave generated in the epicyclic gear train 100. Said phase is that of the contact point for which a speed of rotation has been determined in step 303. This step is detailed in the following, with reference to FIGS. 4A to 4E. It preferably includes a time interpolation of the values $S(t_i)$ acquired in step 301 (primary mechanical wave data). At the end of step 304, a series of values $S(\varphi_k)$ of the signal S formed by the progressive mechanical wave generated in the epicyclic gear train 100 is obtained, where $\varphi_k$ refers to a phase of the contact point considered in step 303. The values $S(\varphi_k)$ form data called secondary mechanical wave data.

Finally, in step 305, said secondary mechanical wave data are used to detect a possible anomaly in the operation of the epicyclic gear train. The information relating to the presence or absence of an anomaly in the operation of the epicyclic gear train, and where applicable relating to the nature of a detected anomaly, together form so-called diagnostic information, D.

The anomaly may relate to a functional failure of the epicyclic gear train, to damage to its components, to operation outside nominal conditions of use (for example a cold start, or lubrication fault in the toothed wheels), or to any other cause likely to modify the progressive mechanical wave generated by clashes of the teeth of the toothed wheels in contact in the epicyclic gear train 100. In particular, a lubrication fault of the planet gears, an increase in torque on the planet gears, an absence of heat dissipation, a misalignment between respective axes of rotation of at least two of the toothed wheels, etc. can be detected. Sudden damage or progressive wear of the epicyclic gear train can be detected.

Anomaly detection uses the secondary mechanical wave data, preferably transformed to facilitate analysis thereof. These transformed data are called analysis data. This transformation is especially aimed at removing noise and context effects. It preferably includes the application of a Fourier transform. The Fourier transform is applied to the secondary mechanical wave data, or to a function obtained by interpolating said secondary mechanical wave data. Here, the Fourier transform transforms a function of a phase into a function of an order. For example, a power spectral density, or an averaged power spectral density, or a spectrogram of the averaged power spectral densities, of the secondary mechanical wave data or of a function obtained by interpolating said secondary mechanical wave data is calculated.

Detection of a possible anomaly in the operation of the epicyclic gear train can use models characterising normal or abnormal operations of the epicyclic gear train, with locating a deviation or similarity relative to these models. These models are called health indicators.

The health indicators may be determined by digital simulations, or using experimental measurements performed on epicyclic gear trains associated with known characteristics and operating conditions. The method according to the invention may include preliminary steps for determining such health indicators, these preliminary steps including:
- for a plurality of flights of at least one aircraft, and where applicable a plurality of flight phases of each flight, acquiring primary mechanical wave data and primary rotation data, and determining the corresponding secondary rotation data and secondary mechanical wave data;
- for each of the plurality of flights, and where applicable for each of the plurality of flight phases of each flight, using the corresponding secondary mechanical wave data to calculate analysis data; and
- correlating said analysis data with information relating to the presence or absence of an anomaly related to the operation of the epicyclic gear train, and where applicable relating to the accurate nature of said anomaly.

The flight phases include especially one or more of a take-off phase, a climb phase, a cruise phase, a descent phase, a landing phase and a taxi phase. The analysis data correspond to the secondary mechanical wave data, transformed as described above.

The health indicators not only detect abnormal operation of the epicyclic gear train, but also identify the anomaly when it is detected. It is also possible to locate wear of the epicyclic gear train at an early stage, before too many defects occur. Early detection of wear of the epicyclic gear train provides offers great flexibility in planning a maintenance operation. A schedule of maintenance operations can thus be optimised so as to minimise a total downtime of the aircraft receiving the epicyclic gear train.

In any case, the method may include a maintenance step, not represented, on the epicyclic gear train 100, implemented in response to the detection of an anomaly, in step 305.

FIGS. 4A to 4E illustrate a step 304 of in-phase synchronous resampling in detail.

Figure 4A:
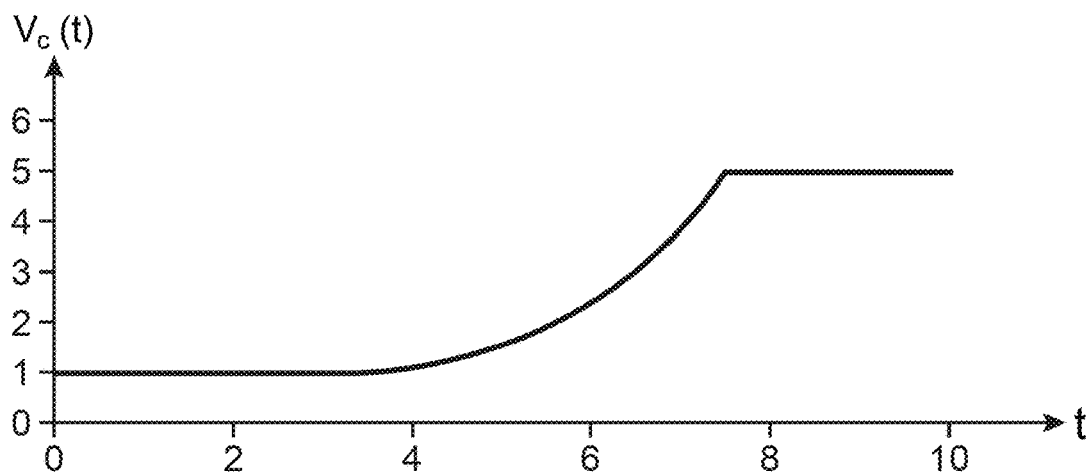
FIGS. 4A to 4E illustrate a resampling according to the invention.

FIG. 4A illustrates the speed of rotation of the contact point considered, $V_c(t)$, as a function of time t. The x-axis is time, in seconds. The y-axis is a speed of rotation, or rpm, in revolutions per minute. The curve $V_c(t)$ is obtained by interpolating the secondary rotation data $V_c(t_j)$. It corresponds here to an acceleration phase.

Figure 4B:
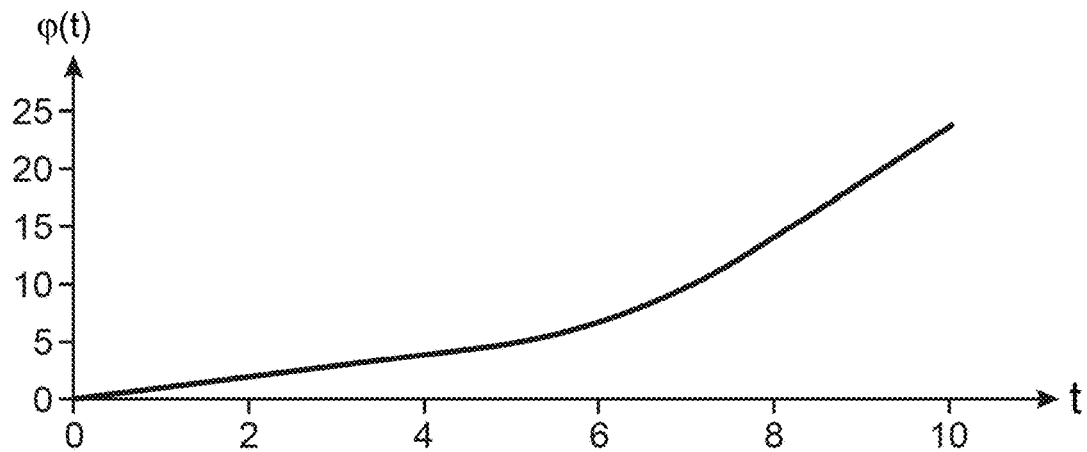

FIG. 4B illustrates the phase of the contact point considered, $\varphi(t)$, as a function of time t. The x-axis is time, in seconds. The y-axis is a phase, in number of revolutions. The function $\varphi(t)$ is obtained by integrating the function $V_c(t)$ over time. The phase thus corresponds to a cumulative number of revolutions made by the contact point considered.

Figure 4C:
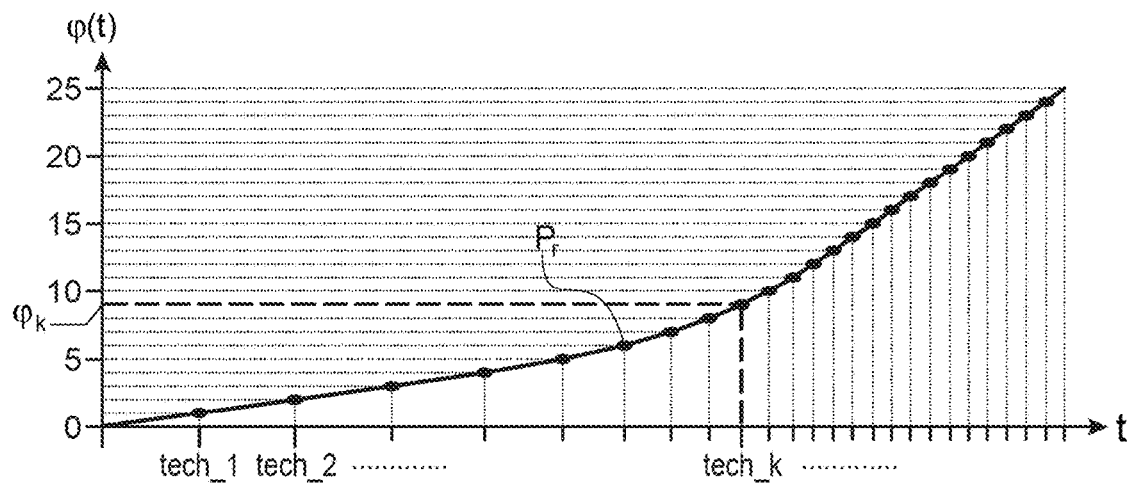

FIG. 4C corresponds to FIG. 4B, where points $P_n$ of regular in-phase sampling have been identified. Each point $P_n$ lies on the curve representative of $\varphi_k$, and links a value of the phase $\varphi_k$ and a value of time $t_{ech\_k}$. The different points $P_n$ are associated with regularly spaced phase values. In other words, the difference between respective phases associated with two neighbouring points $P_n$ is a constant, called the in-phase sampling interval. Here, the in-phase sampling interval is 1 revolution per minute.

Figure 4D:
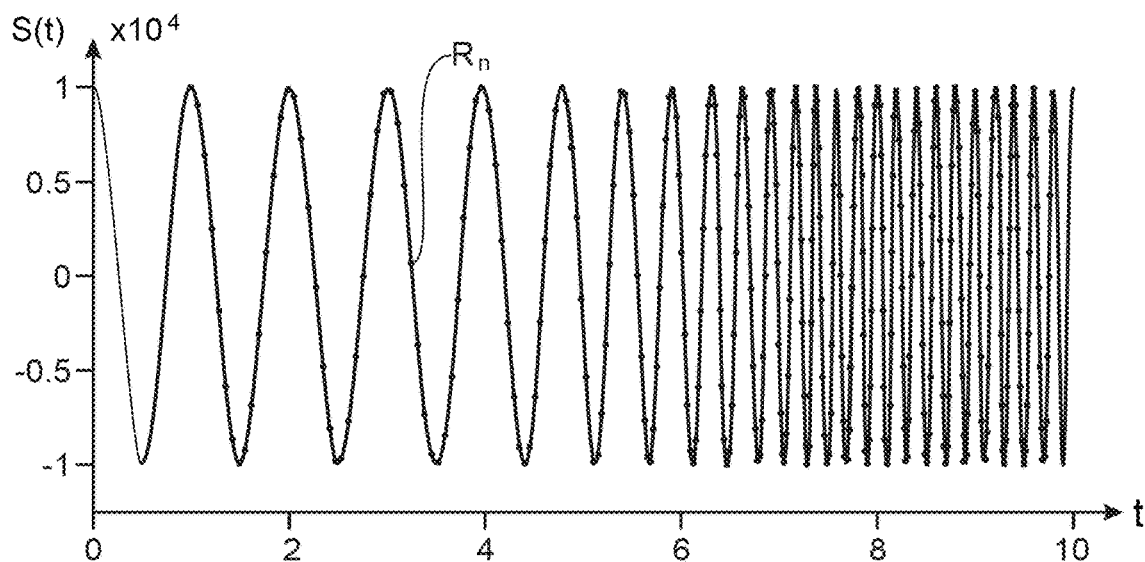

FIG. 4D illustrates the signal S formed by the progressive mechanical wave generated in the epicyclic gear train, as a function of time t. The x-axis is time, in seconds. The y-axis is here acoustic pressure, in Pa. The curve S(t) is obtained by interpolating the primary mechanical wave data $S(t_i)$. In FIG. 4D, sampling points $R_n$ have also been represented. The sampling points $R_n$ are points on the curve S(t) that correspond to the previously determined values $t_{ech\_k}$ of time t. These values $t_{ech\_k}$ therefore correspond to regular in-phase sampling. Each sampling point $R_n$ associates a value $S(t_{ech\_k})$ of the signal S(t), and a value $t_{ech\_k}$ of time t.

As illustrated in FIG. 4C, each value $t_{ech\_k}$ of the time is associated with a value $\varphi_k$ of the phase of the contact point considered. Thus, each value $S(t_{ech\_k})$ of the signal S(t) can be linked to a value $\varphi_k$ of the phase, where the sequence of values $\varphi_k$ corresponds to a regular in-phase sampling. The values $S(t_{ech\_k})$ can therefore be denoted as $S(\varphi_k)$. They form the secondary mechanical wave data according to the invention, associated with a regular sampling as a function of the phase of the contact point considered.

Figure 4E:
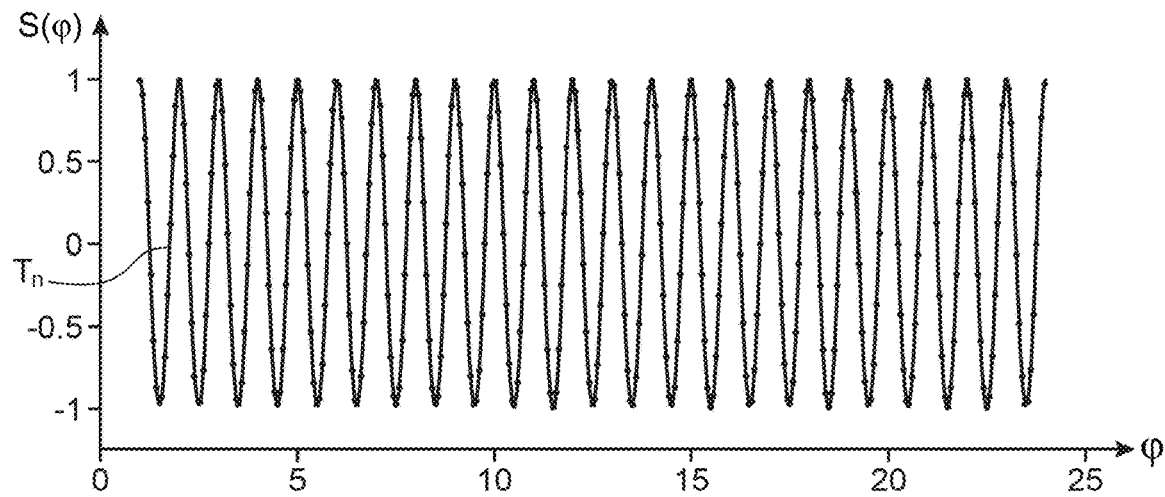

In FIG. 4E, the x-axis is a phase, in number of revolutions, and the y-axis is an acoustic pressure, in Pa. Points $T_n$ each associate one of said values $S(\varphi_k)$ with the corresponding phase value $\varphi_k$. By interpolating the different points $T_n$, a curve representative of a function $S(\varphi)$ is obtained. The function $S(\varphi)$ represents the signal S formed by the progressive mechanical wave generated in the epicyclic gear train, as a function of the phase $\varphi$ of the contact point considered.

Switching from regular sampling as a function of time to regular sampling as a function of phase enables the effect of time variations in the speeds of rotation of the toothed wheels of the epicyclic gear train to be dispensed with. One of the clever ideas underlying the invention is to have chosen as a phase that of a contact point of the epicyclic gear train, rather than the phase of one of the toothed wheels of the epicyclic gear train. The inventors have shown that this choice allows more relevant locating of anomalies related to the operation of an epicyclic gear train.

As explained above, detection of an anomaly related to the operation of the epicyclic gear train is advantageously carried out on so-called analysis data, corresponding to secondary mechanical wave data transformed to facilitate analysis thereof.

The transformation preferably comprises the application of a function which includes a Fourier transform calculation. The Fourier transform here transforms a function of the phase φ of the contact point considered, into a function of a variable called an "order".

Said function can be a power spectral density. The power spectral density is a function that represents the distribution in orders of the power of the Fourier transform (square of the modulus of this Fourier transform). For a digital signal $x_n$ of N samples, an indicator of the power spectral density is a vector with N points, the k-th element of which is defined by:

$$D_X(k) = \frac{|X(k)|^2}{N}$$

where $D_X$ is the power spectral density of the signal x, and X(k) is the k-th element of the discrete Fourier transform of the signal x.

Advantageously, the transformation of the secondary mechanical wave data to form the analysis data may include an interpolation of said secondary mechanical wave data. The function including a Fourier transform calculation is then applied to the result of said interpolation.

FIGS. 5A, 5B and 6A, 6B illustrate the interest of performing regular resampling as a function of the phase of a contact point and then shifting into the order domain.

Figure 5A:
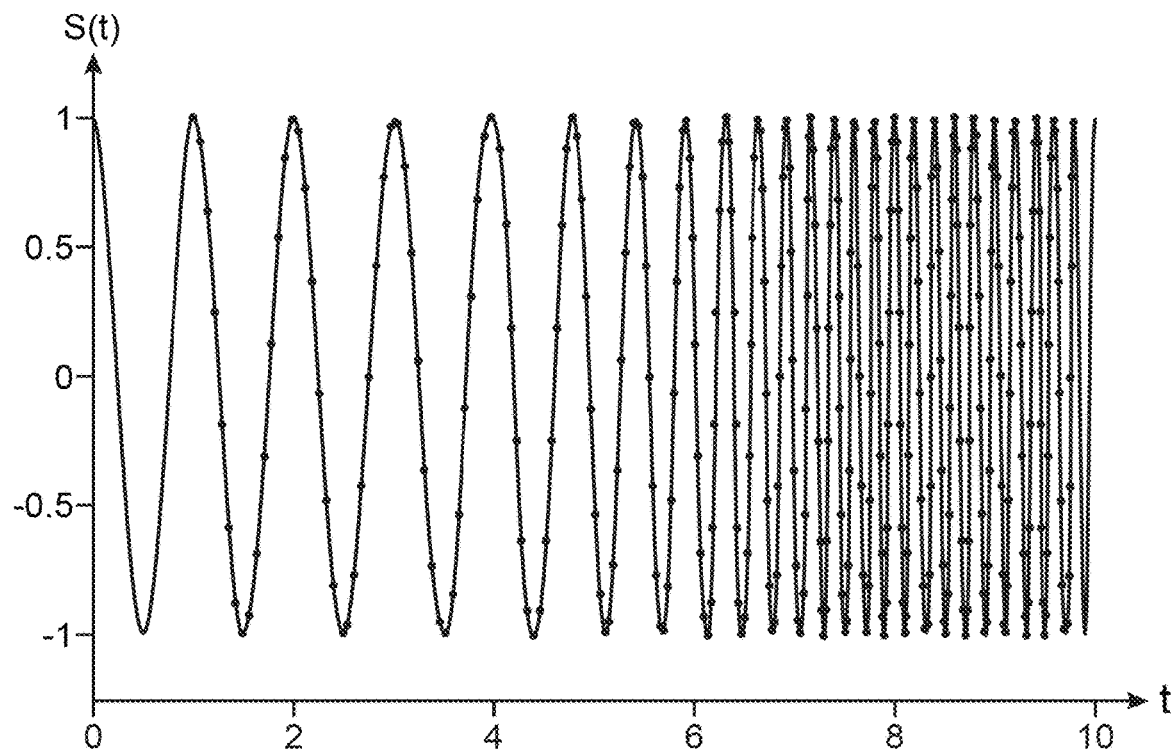
FIGS. 5A and 5B respectively illustrate the signal formed by a progressive mechanical wave generated in the epicyclic gear train of FIG. 1, as a function of time, and a corresponding power spectral density.
Figure 5B:
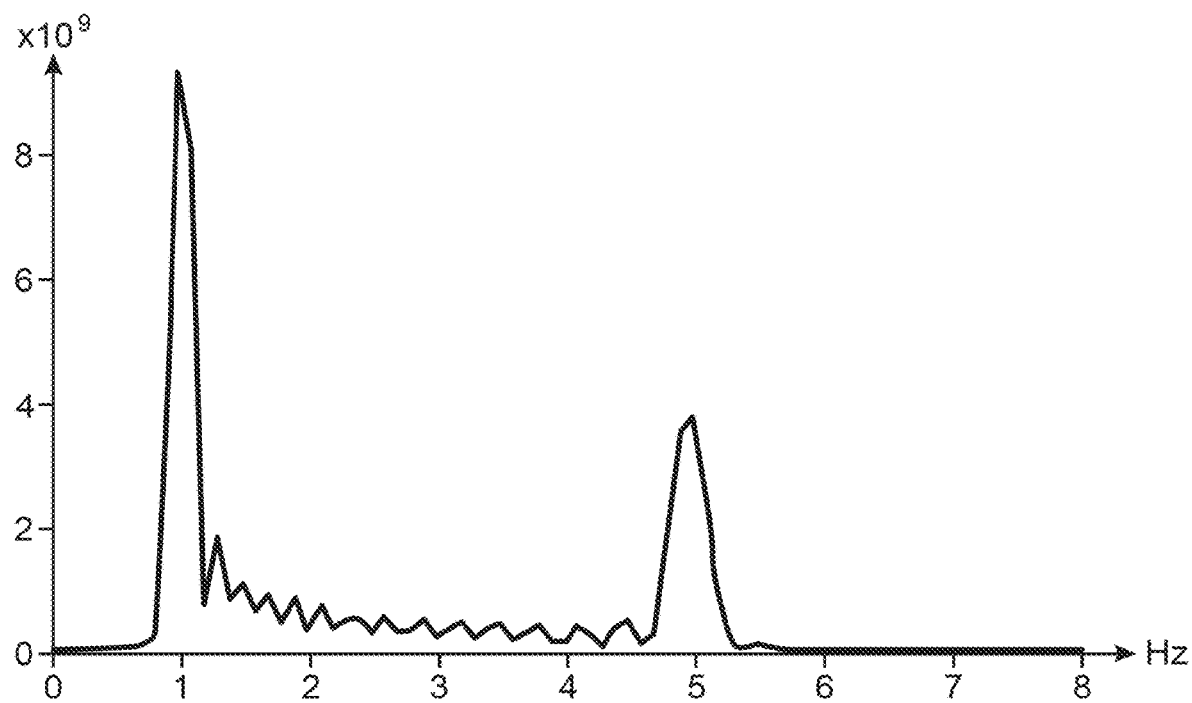

FIG. 5A illustrates the signal S formed by the progressive mechanical wave generated in the epicyclic gear train as a function of time t. The x-axis is time, in seconds. The y-axis here is an acoustic pressure, in Pa. FIG. 5B illustrates the power spectral density of the signal in FIG. 5A, as a function of a frequency in Hz.

Figure 6A:
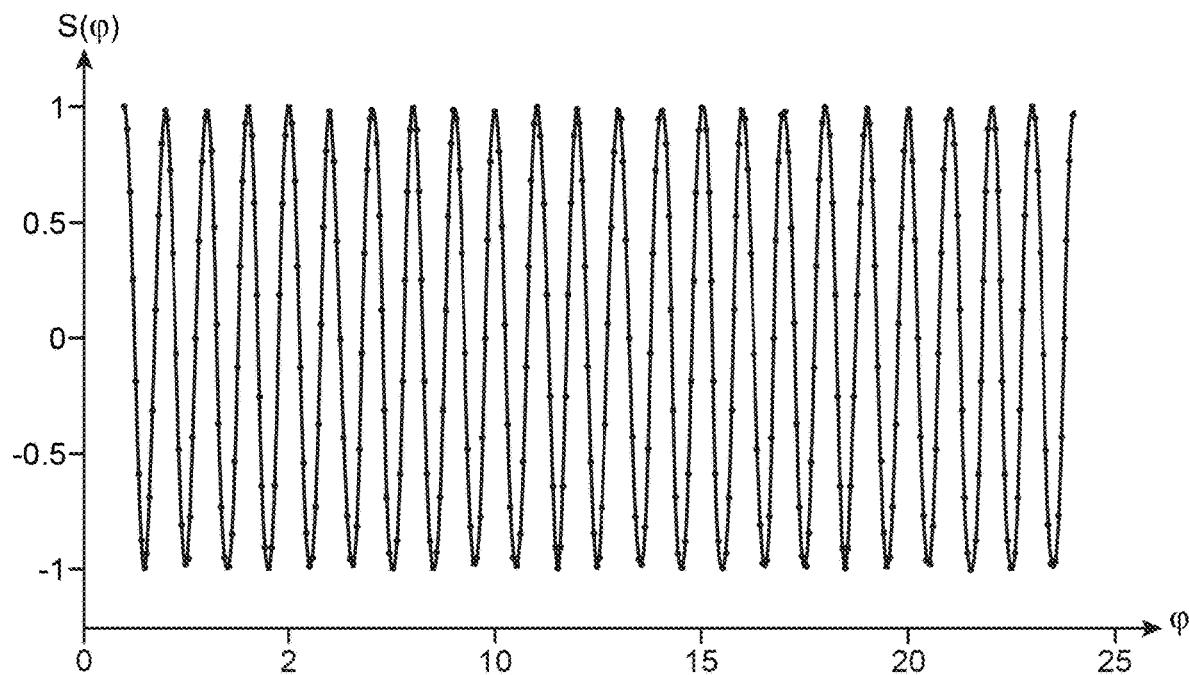
FIGS. 6A and 6B respectively illustrate the same signal as in FIG. 5A, this time represented as a function of the phase of a contact point in the epicyclic gear train, and a corresponding power spectral density.
Figure 6B:
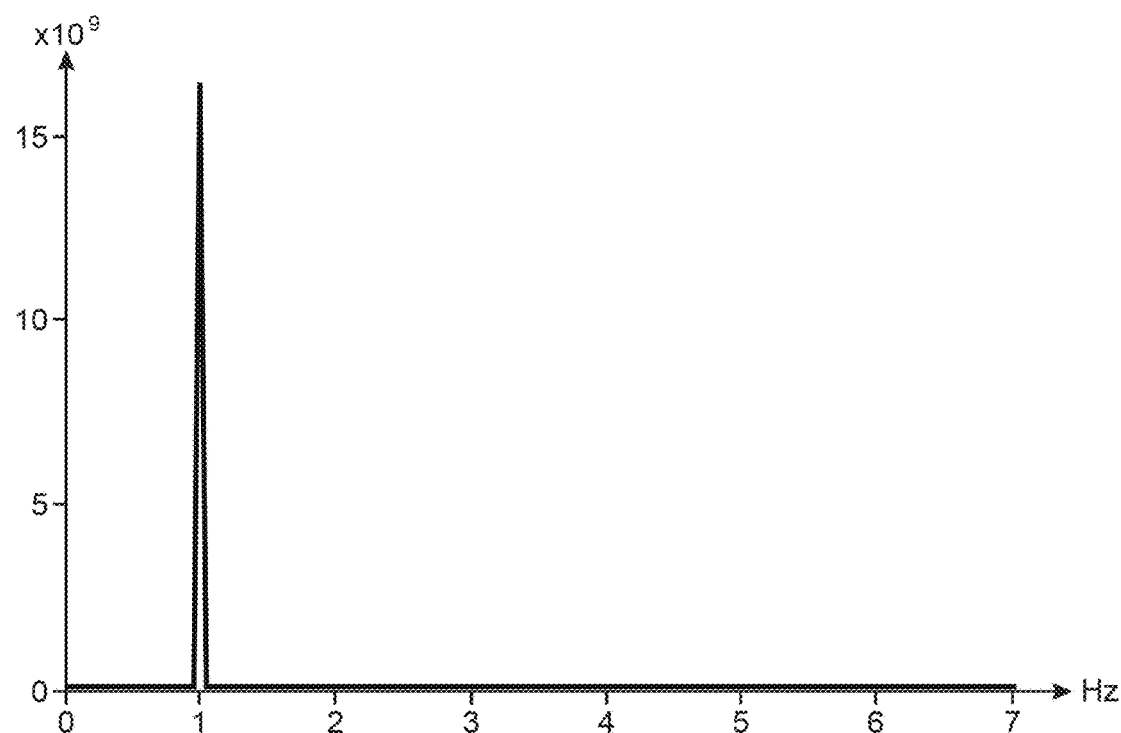

FIG. 6A illustrates the signal S formed by the progressive mechanical wave generated in the epicyclic gear train, as a function of the phase φ of the contact point considered. The x-axis is a phase, in number of revolutions, and the y-axis is an acoustic pressure, in Pa. FIG. 6B illustrates the power spectral density of the signal in FIG. 6A, as a function of an order (inverse of a phase).

The signal in FIG. 6A corresponds to a resampled signal, in which effect of time variations in speeds of rotation in the epicyclic gear train is dispensed with. By shifting this signal into the order domain, a majority component centred on order 1 is very easily identified (see amplitude peak of FIG. 6B).

By virtue of resampling according to the phase of a contact point, followed by a shift into the order domain, signal components due to the epicyclic gear train, and signal components due to noise and environment around the epicyclic gear train can easily be discriminated.

Values of the power spectral density corresponding to integer orders, and in particular to order 1, are the most relevant to determine presence or absence of an anomaly related to the operation of the epicyclic gear train, and where applicable identify the nature of the anomaly. Other order values may be used, preferably situated at symmetrical positions on either side of an integer order.

The use of a power spectral density calculation to obtain the analysis data has been detailed above.

According to one advantageous alternative, an averaged power spectral density (of the secondary mechanical wave data or of a function obtained by interpolating said secondary mechanical wave data) is calculated instead. The averaged power spectral density of a signal is obtained by multiplying that signal by an apodisation window, calculating the power spectral density of the result of said multiplication, and then repeating these steps after offsetting the apodisation window by 50% of its length, and so on until a series of power spectral densities which are then averaged (Welch's method) is obtained. The apodisation window is a function that takes the value zero everywhere except in a narrow band where it has a peak shape. It is defined for example by a Hamming function. This technique eliminates some of the noise and orders that are not dominant.

A spectrogram can also be used, gathering several power spectral densities (averaged or not) calculated over successive time intervals. The time intervals considered overlap with each other. They each correspond to a phase interval of the contact point considered. On the spectrogram, the power spectral density associated with a given phase interval corresponds to a vertical line. This vertical line is aligned with a phase value that corresponds to the centre value of said phase interval. One advantage of analysing the secondary mechanical wave data in the form of such a spectrogram is that the analysis is performed on a compilation of many measurements, thereby dispensing with noise and marginal effects.

On the spectrogram, various remarkable lines can be distinguished, each corresponding to a high value of the power spectral density, which holds over time. Of these remarkable lines, only the straight lines, associated with constant values of the order, relate to the epicyclic gear train. It is thus possible to discriminate between remarkable lines related to the epicyclic gear train, and remarkable lines related to the surrounding environment. This discrimination is particularly useful when the primary mechanical wave data are acoustic data, as the acoustic radiation related to clashing of the toothed wheels actually makes only a small contribution to the total noise emitted at a casing in which the epicyclic gear train is housed.

Lines, or spectrogram lines, associated with constant values of the order are therefore used to determine presence or absence of an anomaly related to the operation of the epicyclic gear train, and where applicable identify the nature of the anomaly. These lines form acoustic signatures of the epicyclic gear train. In particular, spectrogram lines associated with integer values of the order, especially the value one, are used. The presence or absence of one or more of these lines forms a health indicator of the epicyclic gear train, characteristic of the presence or absence of an anomaly in the operation of the epicyclic gear train, and where applicable characteristic of the particular nature of the anomaly.

Figure 7:
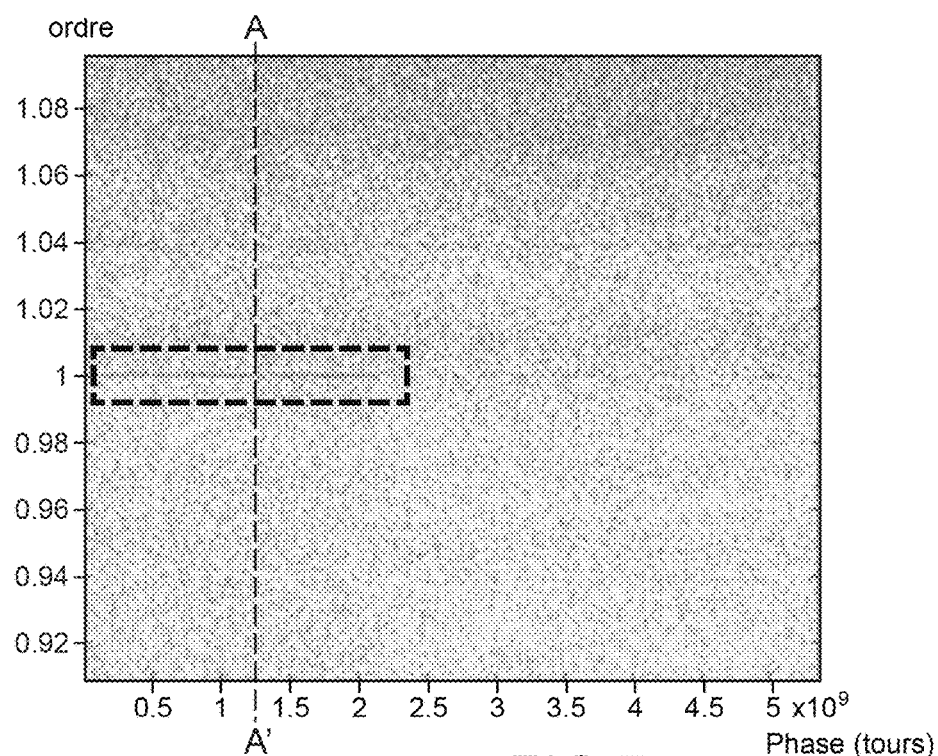
FIGS. 7 and 8 illustrate detail views of a spectrogram obtained using a method according to the invention, centred on order 1 and order 2 respectively.

FIG. 7 illustrates a detail view of such a spectrogram, centred around order 1. The x-axis is a phase, in number of revolutions. The y-axis is an order. The tint scale is an amplitude of the power spectral density, in the logarithmic scale. One of the power spectral densities forming the spectrogram has been represented on the right, corresponding here to the vertical line A-A' on the spectrogram. In FIG. 7, a zone including a horizontal line, aligned with order 1 has been boxed in dotted lines. This line indicates the presence of a maximum of the power spectral density, at order 1 and over a long time.

Figure 8:
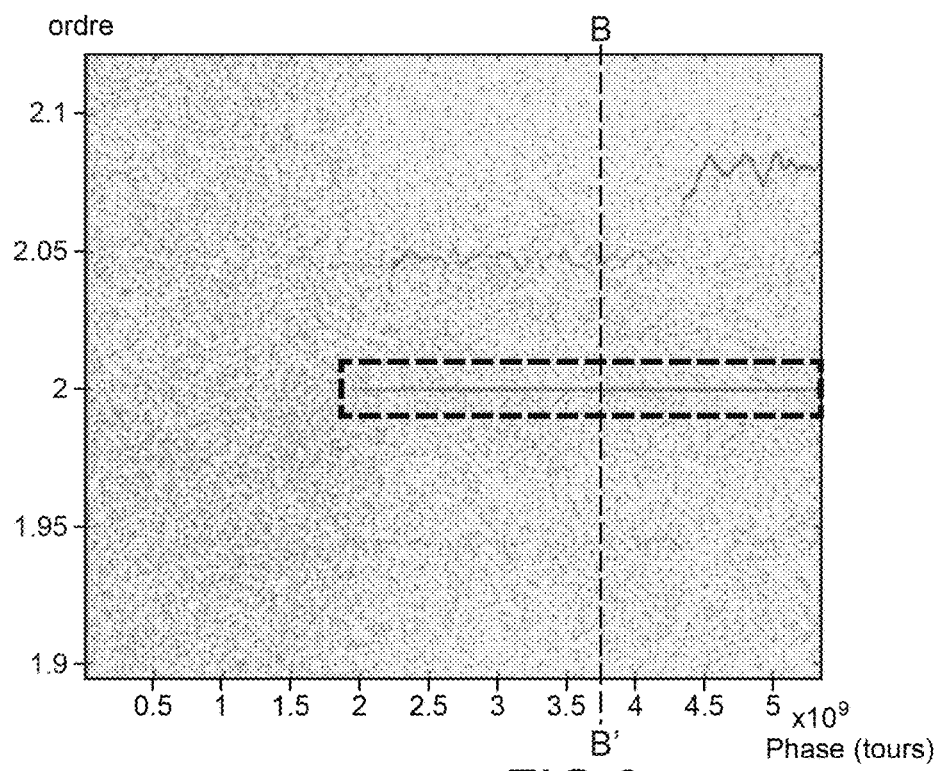

FIG. 8 illustrates a detail view of the same spectrogram, centred around order 2. One of the power spectral densities forming the spectrogram has been represented on the right, corresponding here to the vertical line B-B' on the spectrogram. A horizontal line indicating the presence of a maximum of the power spectral density, at order 2 and over a long time (see boxed zone) is observed.

By comparing FIGS. 7 and 8, an inversion in the preponderance of orders 1 and 2 (disappearance of the line at order 1 coinciding with the appearance of the line at order 2) is observed, which reflects an event on the epicyclic gear train. This event may be related to a sudden degradation of the epicyclic gear train, or simply to a change in the conditions of use, for example a change in the torque applied to the epicyclic gear train. It is therefore advantageous to couple the analysis data calculated in the method according to the invention, with other measurements and monitoring operations carried out simultaneously in the aircraft (detection of flying object impact, measurement of quality of the oil lubricating the toothed wheels of the epicyclic gear train, detection of torque variations, measurements of upstream and downstream temperatures, speed, position in the flight domain, etc.).

Figure 9:
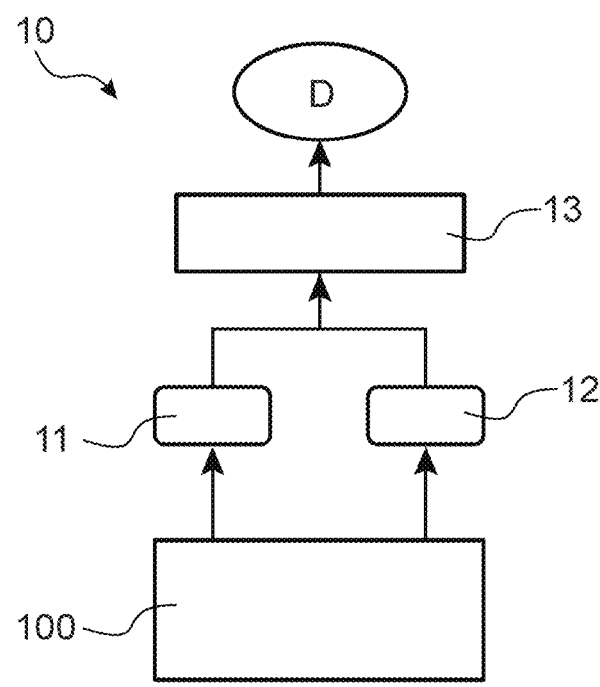
FIG. 9 schematically illustrates a system according to the invention.

FIG. 9 schematically illustrates a system 10 according to the invention for implementing the method described with reference to FIG. 3. The system 10 includes:
- an epicyclic gear train 100, as described with reference to FIGS. 1 and 2, which may be an integral part of a turboprop or reducer motor;
- at least one mechanical wave sensor 11, for example an accelerometer, or more preferentially an acoustic wave sensor such as a microphone, arranged to acquire a signal representative of a progressive mechanical wave generated in the epicyclic gear train 100 by clashing of the teeth of the toothed wheels (primary mechanical wave data);
- at least one speed of rotation sensor 12, for acquiring speed of rotation measurements relating to at least one of the toothed wheels of the epicyclic gear train 100 (primary rotation data); and
- a processor 13, configured to receive as an input the primary mechanical wave data acquired by the mechanical wave sensor 11 and the primary rotation data acquired by the speed of rotation sensor 12, to implement steps 303, 304 and 305 of the method illustrated in FIG. 3, and output diagnostic information D relating to the presence or absence of an anomaly in the operation of the epicyclic gear train, and where applicable relating to the nature of the anomaly.

The mechanical wave sensor 11 is preferably located inside a housing, to protect it from dust or sand, and in proximity to the epicyclic gear train. It is particularly advantageous to use an acoustic wave sensor as the mechanical wave sensor 11. Indeed, data relating to each of the toothed wheels making up the epicyclic gear train can be acquired in a single signal. Furthermore, the acoustic wave sensor can be arranged away from the epicyclic gear train, without direct physical contact with the latter. The acoustic wave sensor can even be located at an airport, to measure an acoustic signal emitted by an approaching or taking-off aircraft. The epicyclic gear train is then monitored from the noise it emits in operation.

Figure 10:
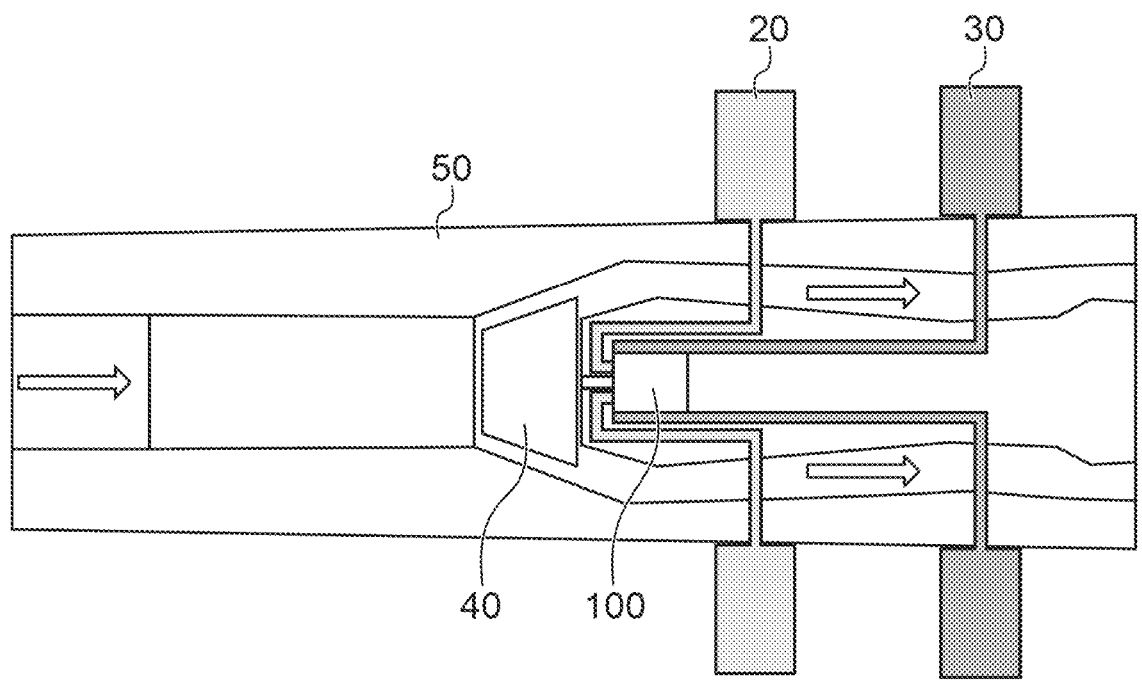
FIG. 10 schematically illustrates of a turbomachine of an aircraft receiving an epicyclic gear train as monitored in the invention.

FIG. 10 schematically illustrates a turbomachine of an aircraft receiving the epicyclic gear train 100. The latter is connected to an upstream propeller 20, a downstream propeller 30, and a turboshaft engine 40. The upstream and downstream propellers are contra-rotating (they rotate in opposite directions) and non-faired (they are located outside a fairing 50 receiving the epicyclic gear train 100 and the turboshaft engine 40). The upstream and downstream propellers have large dimensions, each with a diameter greater than 1.5 metres, for example two metres.

The invention is particularly adapted to the field of high-powered turbojet engines for aircraft, which have about 40% of the engine power and which support energies up to 30 MW/h. It applies especially to the monitoring of an epicyclic gear train power transmission device, for transmitting power from a power turbine to upstream and downstream propellers rotating in opposite directions.

The invention is based on a comparison between an expected model of the noise or vibrations emitted by an epicyclic gear train, and analysis data obtained by measurement and mathematical processing.

Alerts can be implemented to inform maintenance operators of the presence of an anomaly related to the operation of the epicyclic gear train. A maintenance recommendation service can also be implemented for the aircraft operator.

Advantageously, the analysis data obtained using the secondary mechanical wave data according to the invention can be combined with ancillary data from accelerometer-type sensors.

In the examples detailed above, the example of an epicyclic gear train with three planet gears has been illustrated. The invention is not limited to this example, and can be implemented to monitor all kinds of epicyclic gear trains, with any number of planet gears, used as a reducer motor or as a thruster, or even several epicyclic gear trains arranged in series.

What is claimed is:

1. A method for monitoring an epicyclic gear train of an aircraft, the method comprising the following steps of:
  generating a progressive mechanical wave in an epicyclic gear train, wherein the epicyclic gear train includes two coaxially mounted first toothed wheels and at least one second toothed wheel meshing with the two first toothed wheels,
  acquiring by a mechanical wave sensor, at a predetermined sampling frequency, first values of a signal formed by the progressive mechanical wave generated in the epicyclic gear train, said first values forming primary mechanical wave data;
  measuring by a speed rotation sensor, at a plurality of successive time instants, values of a speed of rotation of at least one of the two first toothed wheels and the at least one second toothed wheel, said measured values forming primary rotation data;
  from the primary rotation data, calculating by a processor values of a speed of rotation of a contact point between one first toothed wheel and the one second toothed wheel of the epicyclic gear train, said calculated values forming secondary rotation data;
  from the primary mechanical wave data and the secondary rotation data, determining by the processor second values of said signal formed by the progressive mechanical wave generated in the epicyclic gear train, said second values corresponding to a regular sampling as a function of a phase of said contact point and forming secondary mechanical wave data; and using the secondary mechanical wave data to detect an anomaly related to an operation of the epicyclic gear train.

2. The method for monitoring an epicyclic gear train of an aircraft according to claim 1, wherein the speed of rotation of the contact point between one first toothed wheel and the one second toothed wheel of the epicyclic gear train is a linear combination of the respective speeds of rotation of said first and second toothed wheels.

3. The method for monitoring an epicyclic gear train of an aircraft according to claim 2, wherein at least one of said respective speeds of rotation is calculated from the primary rotation data and respective numbers of teeth of the two first toothed wheels and the at least one second toothed wheel.

4. The method for monitoring an epicyclic gear train of an aircraft according to claim 1, wherein using the secondary mechanical wave data to detect an anomaly related to the operation of the epicyclic gear train comprises:

calculating analysis data by the processor, including calculating a Fourier transform of the secondary mechanical wave data, where the Fourier transform transforms a function of a phase into a function of an order; and using said analysis data to detect an anomaly related to the operation of the epicyclic gear train.

5. The method for monitoring an epicyclic gear train of an aircraft according to claim 4, wherein using said analysis data to detect an anomaly related to the operation of the epicyclic gear train includes using analysis data associated with at least one integer order.

6. The method for monitoring an epicyclic gear train of an aircraft according to claim 4, wherein calculating analysis data comprises calculating a power spectral density of the secondary mechanical wave data.

7. The method for monitoring an epicyclic gear train of an aircraft according to claim 4, wherein calculating analysis data comprises calculating an averaged power spectral density of the secondary mechanical wave data.

8. The method for monitoring an epicyclic gear train of an aircraft according to claim 4, wherein calculating analysis data comprises calculating a spectrogram gathering a plurality of values of an averaged power spectral density of the secondary mechanical wave data.

9. The method for monitoring an epicyclic gear train of an aircraft according to claim 1, wherein the signal formed by the progressive mechanical wave generated in the epicyclic gear train is an acoustic signal, and the mechanical wave sensor is an acoustic wave sensor.

10. The method for monitoring an epicyclic gear train of an aircraft according to claim 9, wherein the acoustic wave sensor is arranged spaced from the epicyclic gear train.

11. The method for monitoring an epicyclic gear train of an aircraft according to claim 1, wherein the signal formed by the progressive mechanical wave generated in the epicyclic gear train is a vibration signal, and the mechanical wave sensor is an accelerometer.

12. The method for monitoring an epicyclic gear train of an aircraft according to claim 1, further including a maintenance step on the epicyclic gear train, when an anomaly related to the operation of the epicyclic gear train is detected using the secondary mechanical wave data.

13. The method for monitoring an epicyclic gear train of an aircraft according to claim 1, further including a preliminary step of determining health indicators, which includes the following steps of:

for a plurality of flights, acquiring primary mechanical wave data and primary rotation data, and determining the corresponding secondary rotation data and secondary mechanical wave data;

for each of the plurality of flights, calculating analysis data, said calculating including calculating a Fourier transform of the secondary mechanical wave data; and correlating the analysis data with information relating to an anomaly or absence of anomaly in the operation of the epicyclic gear train.

14. A monitoring system for monitoring an epicyclic gear train of an aircraft, the system comprising:

an epicyclic gear train which includes two coaxially mounted first toothed wheels, a first rotation shaft, and at least one second toothed wheel configured to mesh with the two first toothed wheels, wherein the at least one second toothed wheel comprises a second rotation shaft;

at least one mechanical wave sensor configured to acquire, at a predetermined sampling frequency, first values of a signal formed by a progressive mechanical wave generated in the epicyclic gear train, said first values forming primary mechanical wave data;

at least one speed of rotation sensor configured to acquire, at a plurality of successive time instants, values of a speed of rotation of at least one of the two first toothed wheels and the at least one second toothed wheel, said values forming primary rotation data; and a processor configured to receive as an input the primary mechanical wave data and the primary rotation data, configured to calculate values of a speed of rotation of a contact point between the one first toothed wheel and the one second toothed wheel of the epicyclic gear train configured to determine second values of said signal formed by the progressive mechanical wave generated in the epicyclic gear train, said second values being sampled as a function of a phase of said contact point, and configured to output a piece of information relating to a presence or not of an anomaly in an operation of the epicyclic gear train.

15. The monitoring system for monitoring an epicyclic gear train of an aircraft according to claim 14, wherein the mechanical wave sensor is an acoustic sensor arranged spaced from the epicyclic gear train.

* * * * *